March 23, 1926.
H. KOCH ET AL
1,577,911
LOUD SPEAKER FOR VEHICLES
Filed March 27, 1922
2 Sheets-Sheet 1
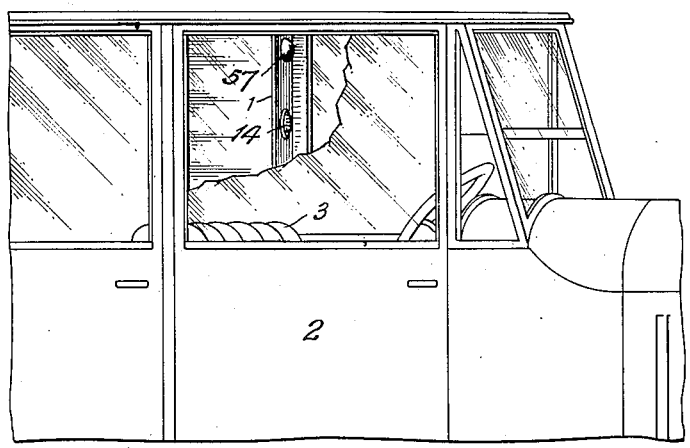
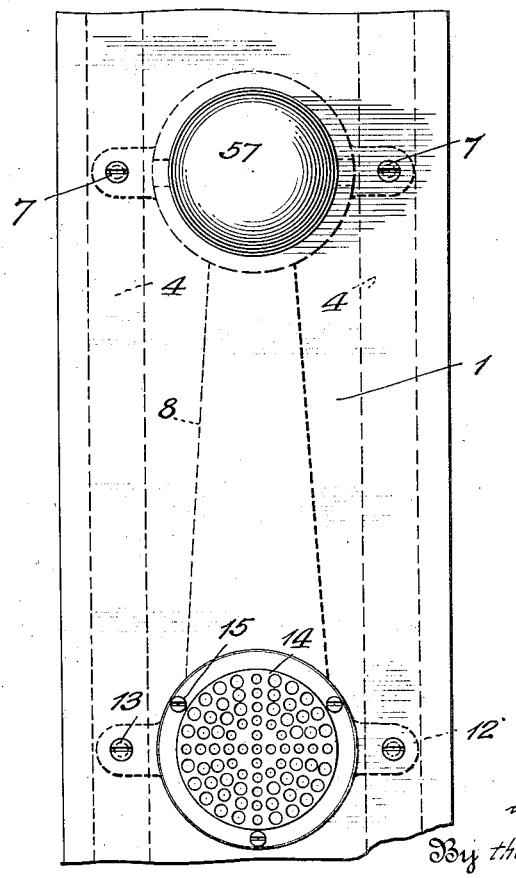
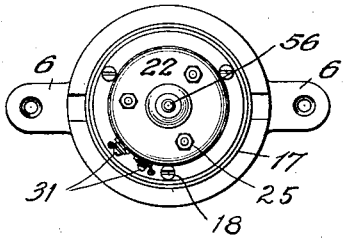
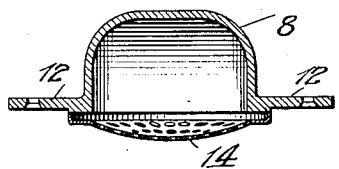
Inventors
Henry Koch
and Friedrich H. N. Wohlers
By their Attorneys
Stockbridge & Borst.

March 23, 1926.
H. KOCH ET AL
1,577,911
LOUD SPEAKER FOR VEHICLES
Filed March 27, 1922    2 Sheets-Sheet 2
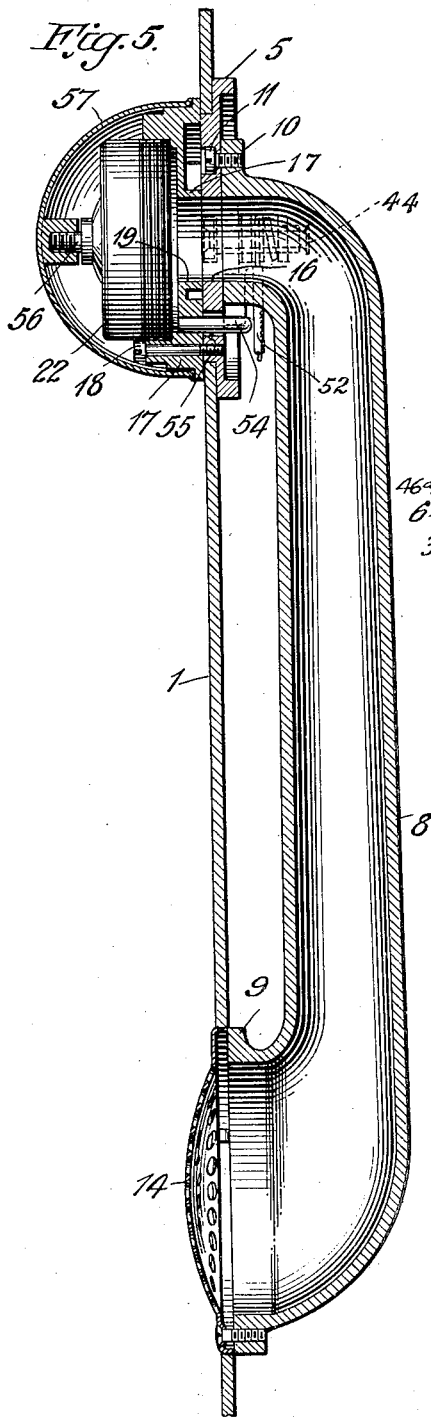
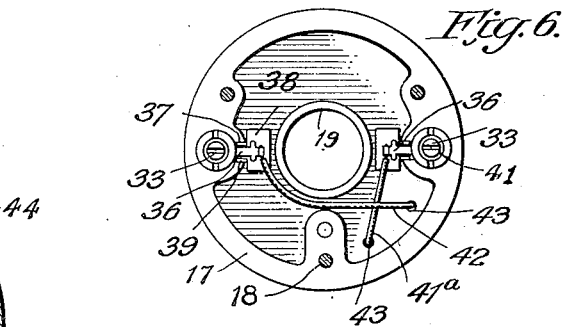
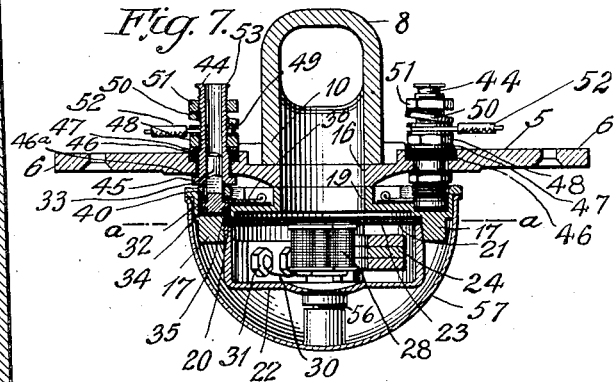
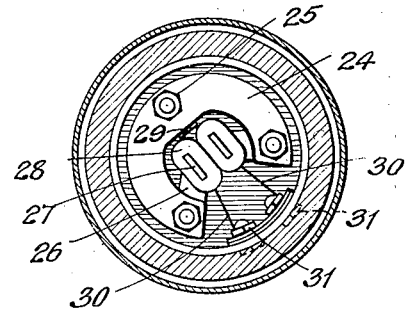
Inventors
Harry Koch
and Friedrich H. N. Wohlers
By their Attorneys
Stockbridge & Borst.

Patented Mar. 23, 1926.

1,577,911

UNITED STATES PATENT OFFICE.

HENRY KOCH AND FRIEDRICH H. N. WOHLERS, OF JAMAICA, NEW YORK, ASSIGNORS TO DICTOGRAPH PRODUCTS CORPORATION, A CORPORATION OF VIRGINIA.

LOUD SPEAKER FOR VEHICLES.

Application filed March 27, 1922. Serial No. 547,113.

*To all whom it may concern:*

Be it known that we, HENRY KOCH and FRIEDRICH H. N. WOHLERS, citizens of the United States, residing at Jamaica, in the county of Queens and State of New York, have invented certain new and useful Improvements in Loud Speakers for Vehicles, of which the following is a full, clear, and exact description.

It is frequently desirable that loud speaking telephone receivers be concealed within walls or partitions, so as to occupy a minimum external space and be inconspicuous. In motor vehicles, it is particularly desirable that the loud speaking receiver which is utilized by passengers for communication with a chauffeur be disposed in a position in which it will not be struck by the chauffeur and that it be inconspicuous in appearance.

The invention has for an object to provide an improved loud speaking telephone receiver which may be largely concealed within a wall or a partition; with which the controlling circuit connections leading thereto may be permanently connected thereto within the wall or partition in which it is concealed; and in which the operating parts are readily removable from the amplifier for inspection or repair without injury to the walls or partitions and without breaking or interrupting the permanent circuit connections within the walls or partitions. A further object is to provide an improved device for this purpose in which, when the device is disposed within a wall or partition, the exposed parts will be attractive and inconspicuous; which may be disposed within an exceedingly thin partition or wall and which is simple, compact, effective, durable, inexpensive and readily and easily assembled or taken apart. Other objects and advantages will be apparent from the following description of an embodiment of the invention and the novel features will be particularly pointed out in the claims.

In the accompanying drawing:

Fig. 1 is a fragmentary perspective of a portion of a closed motor vehicle and illustrating the appearance of the loud speaking receiver when installed therein;

Fig. 2 is a front elevation of a portion of a wall in which the receiver is mounted;

Fig. 3 is an elevation of the sound entrance end of the device when the protecting shell is removed;

Fig. 4 is a transverse section through the receiver at the discharge end;

Fig. 5 is a transverse sectional elevation through the wall and receiver;

Fig. 6 is an elevation of the sound producing mechanism separated from the amplifier;

Fig. 7 is a sectional plan through the receiver at the sound producing end; and

Fig. 8 is a section of the same taken substantially along the line *a—a* of Fig. 7.

In the illustrated embodiment, the receiver is concealed within a wall 1 of a motor vehicle 2 adjacent the chauffeur's seat 3. In such walls or partitions a plurality of spacing strips 4 extend vertically and the receiver is adapted to be concealed in the space between two of these strips. An apertured plate 5 is disposed across the upper opening in the wall 1, the plate having ears 6 extending laterally therefrom which overlap the spacing strips 4 and are secured thereto in any suitable manner, such as by screws 7. A shallow or flattened sound amplifier 8 is provided with end portions 9 and 10 which extend in parallel directions and perpendicularly to the wall. The sound entrance end 10 of the amplifier is connected to the rear face of the plate 5 in a suitable manner, such as by screws 11. The sound discharge end of the amplifier is provided with laterally extending ears 12 which overlap the spacing strips 4 between which it is disposed and are secured thereto in a suitable manner such as by screws 13. A suitable apertured plate or screen 14 is secured across the open end of the amplifier by screws 15 so as to conceal the end of the amplifier without preventing the egress of sound waves therefrom.

The sound entrance end of the conduit of the amplifier is disposed in alignment with an aperture 16 in the plate 5 and an annular ring 17 is secured by screws 18 to the plate 5 upon the face thereof which is opposite from the amplifier, the inner circumference 19 of the aperture of the ring being aligned with the aperture 16 of the plate 5. The outer face of the ring 17 is provided with a shoulder 20 against which a diaphragm 21 is clamped by means of a cup-shaped casing 22, the open end of which threads into the ring 17 and against the diaphragm. Suitable gaskets 23 are interposed on opposite faces of the diaphragm to insure a uniform grip around the periphery of the diaphragm.

Within the casing 22 a horseshoe magnet 24 is secured by means of bolts 25 and polar arms 26 extend inwardly from the ends and lower faces of the magnet 24. The polar arms are turned upwardly at right angles to the plane of the magnet 24 to form pole pieces which carry thereon bobbins 28 formed of coiled wire. The bobbins are connected in series by a wire 29 and the other terminal wires 30 of the bobbins are connected to binding posts 31 passing through the wall of the casing 22. The inner face of the ring 17 is provided with sockets 32 in which contact pins 33 are disclosed. These contact pins are each provided at a point adjacent their lower end with a flange 34 and upon the extreme lower end of each post an insulating washer 35 is riveted for spacing the contact pin from electrical contact with the bottom and the side walls of the socket, the insulating washer being of a greater diameter than the flange of the pin. A contact strip 36 is provided with an eye which fits over the shank of the pin and against the flange at the lower end to form electrical contact therewith, a wall of the socket having a groove 37 through which the contact strip extends. An insulating sheet 38 is disposed beneath the contact strip so as to prevent electrical connection of the same with the inner face of the ring, and is provided with struck-up flanges 39 which extend along the sides of the groove 37 and space the contact strip therefrom. Insulating washers 40 are disposed over the shanks of the pins and forced down against the contact strip to hold the same against the flange of the pin and to insulate the shank of the pin from the walls of the socket. Tubular nuts 41 having apertures larger than the diameter of the pins 33 are passed over the pins and threaded into the upper ends of the sockets so as to be adjusted against the upper washers 40 and anchor the pins securely in their sockets. Wires 41ª and 42 pass through apertures 43 in the ring 17 and connect the contact strips 36 with the outer ends of the binding posts 31 of the casing.

Tubular screws 44 having flanged heads 45 pass through the plate 5 from the forward to the rear face and carry upon their rear ends insulating washers 46 which are disposed in recesses in the rear face of the plate 5, to space the screws from the plate. An insulating washer 46ª is disposed beneath the head of each screw 44 to insulate it from the plate. Metal washers 47 and a nut 48 abut against the washers 46 and secure the screws to the plate. Two metal washers 49, a spring split washer 50 and a nut 51 are placed in the order named upon the ends of each screw. Circuit wires 52 have their uninsulated terminals disposed each between the two washers 49 of a screw and clamped therebetween and against the nut 47 by the adjustment towards the plate 5 of the nut 51. The spring split washer 50 serves as a locking device to prevent accidental loosening of the nut 51 due to vibrations, jars, etc. The rear end of each tubular screw 44 may be given a slight outward flare as shown at 53 to prevent complete removal and misplacement of the nut 51 and the washers when repairs or disconnections are made. The pins 33 are split longitudinally for some distance from their outer ends and are provided with rounded noses to facilitate their insertion into the holes in the tubular screws. The split ends of the pins frictionally engage the walls of the holes in the screws and form firm electrical contacts therewith. A dowel pin 54 projects rearwardly from the ring 17 and enters an aperture 55 in the plate 5 to aid in positioning the ring 17 in such an angular position that the pins 33 will be aligned with the holes in the tubular screws 44. When the ring 17 is pushed toward the plate 5, the pins 33 will enter the holes in the tubular screws and be frictionally engaged with the walls thereof, and the pin 54 will prevent rotary movement of the ring 17 with respect to the plate 5 to prevent the placing of lateral stresses upon the contact pins 33. A threaded stem 56 extends outwardly and centrally of the end wall of the casing 22 and a cup-shaped shell 57 is threaded upon the stem 56 so as to embrace the casing 22 and the ring 17 and effectively conceal and protect the same.

In the installation of the receiver into a vehicle the amplifier 8 is mounted in a wall or partition between the strips 4, and secured thereto by the screws 7 with the ends of the amplifier aligned with apertures in the wall or partition, the plate 5 on the small end of the amplifier and the ears 12 of the discharge end of the amplifier serving to support the same across the strips 4. The circuit wires leading from the battery and transmitter are carried through the partition or wall and connected to the rear or inner ends of the tubular screws 44 in the manner shown in Fig. 7. The diaphragm is clamped between the casing 22 and the ring 17 and the wires 41 and 42 are connected between the binding posts 31 and the contact strips 36. The ring 17 is then applied to the plate 5 so as to overlap the aperture in the wall or partition and bring the aperture 19 of the ring into alignment with the aperture 16 of the plate. The pin 54 on the ring 17 is inserted into the aperture 55 of the plate which serves to align the contact pins 33 with the holes in the tubular screws 44. The ring 17 is then forced against the face of the plate 5, which act causes the contact pins 33 to enter the holes in the tubular screws 44 and by frictional engagement form firm electrical contacts therewith. The screws 18 are then applied to prevent removal of the ring 17 from the plate 5 after which the shell 57 is threaded upon the stem 56 to conceal the ring 17, the screws 18, the casing and the binding post 31. The apertured plate 14 is also applied across the discharge end of the amplifier so as to conceal the aperture in the wall and at the same time permit the passage therethrough of the sound waves from the amplifier.

It will be noted that if at any time it is desired to have access to the interior of the casing 22 or to remove the ring 17 from the plate 5, it is unnecessary to disconnect the circuit wire 52 from the tubular screws, it being merely necessary to remove the shell 57 and then the screws 18, which will permit the ring 17 to be pulled outwardly from the plate 5. During this movement the contact pins 33 will be pulled from their positions within the tubular screws and break the electrical contact between them. The parts are reapplied in the reverse order. If it is desired to remove the casing 22, the wires 41 and 42 are first disconnected from the outer ends of the binding posts 31, after which the casing 22 may be unscrewed from the ring 17.

The only exposed and visible portions of the improved receiver are the apertured plate or screen 14 and the shell 57, which are comparatively inconspicuous, and may be attractively finished. Their projection from the wall or partition is slight so that there is little or no danger of the chauffeur bumping against the same when entering, leaving or driving the vehicle.

It will be obvious that various changes in the details and arrangements of parts herein described and illustrated for the purpose of explaining the nature of the invention may be made by those skilled in the art within the principle and scope of the invention.

We claim:

1. In a loud speaking telephone receiver for concealment in walls, an amplifier having its ends extending at right angles to the body of the amplifier, lateral extensions on the ends disposed parallel with the body of the amplifier and adapted for attachment to a wall, and a telephone receiver connected to the small end of the amplifier and adapted to be disposed on that side of the wall opposite the amplifier.

2. In a loud speaking telephone receiver for concealment in walls, an amplifier having its ends extended at right angles to the body of the amplifier, lateral extensions on the ends disposed parallel with the body of the amplifier and adapted for attachment to the walls, a telephone receiver connected to the small end of the amplifier, so as to be accessible from the exterior of the wall, conductor connection terminals on the small end of the amplifier, and connection terminals on the receiver adapted to engage automatically with the terminals on the amplifier when the receiver is applied thereto.

3. In a loud speaking telephone receiver for concealment in walls, an amplifier having its ends extending at right angles to the body of the amplifier, lateral extensions on the ends disposed parallel with the body of the amplifier and adapted for attachment to the walls, a telephone receiver connected to the small end of the amplifier, so as to be accessible from the exterior of the walls, conductor connection terminals on the small end of the amplifier, connection terminals on the receiver adapted to engage automatically with the terminals on the amplifier when the receiver is applied thereto, and a pin and socket connection between the receiver and the amplifier for positioning the receiver relatively to the amplifier to facilitate the engagement of the connection terminals when the receiver is applied to the amplifier and to prevent relative rotation when so applied.

4. In a loud speaking telephone receiver for concealment in walls, an amplifier to be concealed behind a wall with its ends aligned with openings in the wall, and a telephone receiver detachably connected to the sound entrance end of said amplifier, and adapted to be disposed upon the exterior of the wall.

5. In a loud speaking telephone receiver for concealment in walls, an amplifier to be concealed in a wall with its ends aligned with openings in the wall, a telephone receiver detachably connected to the sound entrance end of said amplifier and adapted to be disposed upon the exterior of the wall, conductor connection terminals on the sound entrance end of said amplifier to which the circuit wires are connected, and connection terminals on the receiver adapted to engage automatically with the terminals on the amplifier when the receiver is applied thereto.

6. In a loud speaking telephone receiver for concealment in walls, an amplifier to be concealed in a wall with the sound entrance end flanged and aligned with an opening in the wall, a conductor connection terminal projecting through the flange and terminating at the outer face in a socket, a telephone receiver detachably connected to the sound entrance end of the amplifier and having a conductor connection pin entering the socket and forming electrical contact therewith when the receiver is attached to the amplifier.

7. In a loud speaking telephone receiver, an apertured plate, an amplifier connected to said plate with its sound entrance end abutting against, and aligned with an aperture in said plate, a telephone receiver detachably connected to the face of the plate opposite from the amplifier and adapted to supply sound waves which pass through the aperture in said plate and into the sound entrance end of the amplifier, conductor terminals passing through and carried by the plate and having at the side of the plate to which the amplifier is connected provision for the attachment of circuit conductors, insulation between said terminals and the plate, and connection terminals carried by the receiver and engaging with the conductor terminals to form electrical contact therewith when the receiver is attached to the plate.

8. In a loud speaking telephone receiver, an apertured plate, an amplifier connected to said plate with its sound entrance end abutting against, and aligned with an aperture in said plate, an annular ring detachably connected to the plate on the face thereof opposite the amplifier, a cup-shaped casing threaded at its open face into said ring, a diaphragm clamped between the ring and the casing and electromagnetic actuating mechanism for said diaphragm carried in said casing, in operative position with respect to the diaphragm.

9. In a loud speaking telephone receiver, an apertured plate, an amplifier connected to said plate with its sound entrance end abutting against, and aligned with an aperture in said plate, an annular ring attached to the plate on the face thereof opposite the amplifier and in alignment with the aligned apertures, a cup-shaped casing threaded at its open face into said ring, a diaphragm clamped between the ring and the casing, electromagnetic actuating mechanism for said diaphragm carried in said casing, in operative position with respect to the diaphragm, conductor connection terminals, passing through and carried by the plate, instrument connection terminals carried by the ring and adapted to engage automatically with the conductor connection terminals and, from electrical connections therewith when the ring is attached to the plate, and conductors connecting the instrument connection terminals to the electromagnetic actuating mechanism in said casing.

10. In a loud speaking telephone receiver, an apertured plate, and amplifier connected to said plate with its sound entrance end abutting against, and aligned with an aperture in said plate, an annular ring attached to the plate on the face thereof opposite the amplifier and in alignment with the aligned apertures, a cup-shaped casing threaded at its open face into said ring, a diaphragm clamped between the ring and the casing, electromagnetic actuating mechanism for said diaphragm carried in said casing, in operative position with respect to the diaphragm, conductor connection terminals passing through and carried by the plate, instrument connection terminals carried by the ring and adapted to engage automatically with the conductor connection terminals and form electrical connections therewith when the ring is attached to the plate, binding posts carried by the casing and connected to the electromagnetic actuating mechanism, and conductors connecting the binding posts to the instrument connection terminals on said ring.

11. In a loud speaking telephone receiver, an apertured plate, an amplifier connected to said plate with its sound entrance end abutting against and aligned with an aperture in said plate, an annular ring attached to the plate on the face thereof opposite the amplifier and in alignment with the aligned apertures, a cup-shaped casing threaded at its open face into said ring, a diaphragm clamped between the ring and the casing, electromagnetic actuating mechanism for said diaphragm carried in said casing, in operative position with respect to the diaphragm, a threaded post extending outwardly from the bottom wall of the casing, and a shell threaded upon the post and embracing and concealing the ring and casing.

12. In a loud speaking telephone receiver, an apertured plate, an amplifier connected to said plate with its sound entrance end abutting against, and aligned with the aperture in said plate, a sound producing device attached to the face of the plate opposite from the amplifier and adapted to discharge sound waves through the aperture in said plate, tubular binding posts carried by the plate to which circuit wires may be connected, and pin binding posts carried by the sound producing device and adapted to enter the tubular posts and form electrical connections therewith when the sound producing device is attached to the plate.

13. In a loud speaking telephone receiver, an apertured plate, an amplifier connected to said plate with its sound entrance end abutting against, and aligned with the aperture in said plate, a sound producing device attached to the face of the plate opposite from the amplifier and adapted to discharge sound waves through the aperture in said plate, tubular binding posts passing through the plates and having flanged ends limiting movement through the plate towards the amplifier, nuts adjustable upon the ends of the posts at the amplifier side of the plate by which circuit wires may be connected to said posts and pin binding posts carried by the sound producing device and adapted to enter the tubular posts and form electrical connections therewith when the sound producing device is attached to the plate.

14. In a loud speaking telephone receiver, an apertured plate, an amplifier connected to said plate with its sound entrance end abutting against, and aligned with the aperture in said plate, a sound producing device having electromagnet operating means attached to the face of the plate opposite from the amplifier and adapted to discharge sound waves through the aperture in said plate, tubular binding posts carried by the plate to which circuit wires may be connected, pin bending posts carried by the sound producing device and adapted to enter the tubular posts and form electrical connections therewith when the sound producing device is attached to the plate, and apertured contact strips through the aperture of each of which a pin post passes to form electrical connection therewith, and connections between said contact strips and the electromagnetic operating means.

15. In a loud speaking telephone device for mounting within a wall, an amplifier disposed within the wall with its ends in communication with openings in the wall, and a telephone receiver in communication with the sound entrance end of the amplifier through one of the openings, this receiver being detachably secured to the exterior of the wall adjacent the said opening and being removable from the wall as a unit.

16. In a vehicle having a pair of compartments separated by a wall, an amplifier disposed within the wall, apertures in the wall through which access is had to the ends of the amplifier, and a telephone receiver detachably secured to the exterior of the wall and in communication with the sound entrance end of the amplifier through one of the apertures.

17. In a vehicle having a pair of compartments separated by a wall, an amplifier disposed within the wall, apertures in the wall through which access is had to the ends of the amplifier, a telephone receiver detachably secured on the exterior of the wall and in communication with the sound entrance end of the amplifier through one of the apertures, terminals in the wall connected to wiring for the receiver and terminals connected to the receiver and adapted to contact with the terminals first mentioned when the receiver is mounted in position.

In witness whereof, we hereunto subscribe our signatures.

HENRY KOCH.
FRIEDRICH H. N. WOHLERS.